United States Patent
Borislow et al.

(10) Patent No.: US 8,867,716 B2
(45) Date of Patent: *Oct. 21, 2014

(54) TELEPHONE NUMBER SHARING CONFIGURATION

(71) Applicant: Magicjack Vocaltec., Ltd., Netanya (IL)

(72) Inventors: Daniel Borislow, Palm Beach, FL (US); Gregory Lynn Wood, Columbia, TN (US)

(73) Assignee: MagicJack VocalTec., Ltd., Netanya (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/217,411

(22) Filed: Mar. 17, 2014

(65) Prior Publication Data

US 2014/0198904 A1    Jul. 17, 2014

Related U.S. Application Data

(63) Continuation of application No. 13/633,048, filed on Oct. 1, 2012, now Pat. No. 8,737,586, which is a continuation of application No. 13/437,863, filed on Apr. 2, 2012, now Pat. No. 8,306,201.

(51) Int. Cl.
   *H04M 1/56* (2006.01)
   *H04M 3/42* (2006.01)

(52) U.S. Cl.
   CPC .................. *H04M 3/42059* (2013.01)
   USPC ............. 379/142.06; 379/88.19; 379/142.01; 379/142.02; 379/142.09

(58) Field of Classification Search
   USPC ........ 379/88.2, 88.19, 88.21, 142.01, 142.02, 379/142.06, 142.09; 455/415
   See application file for complete search history.

(56) References Cited

U.S. PATENT DOCUMENTS

| | | |
|---|---|---|
| 6,587,458 B1 | 7/2003 | Burg et al. |
| 2002/0181681 A1 | 12/2002 | Mani |
| 2004/0072593 A1 | 4/2004 | Robbins et al. |
| 2005/0131989 A1 | 6/2005 | Beckmann et al. |
| 2007/0201646 A1 | 8/2007 | Metcalf |
| 2007/0206752 A1 | 9/2007 | Nguyen et al. |
| 2008/0037729 A1 | 2/2008 | Mobin et al. |
| 2012/0051267 A1 | 3/2012 | Ma et al. |

OTHER PUBLICATIONS

PCT International Search Report and Written Opinion, PCT Application No. PCT/IB13/01018, Nov. 1, 2013, 11 pages.

*Primary Examiner* — Oleg Asanbayev
(74) *Attorney, Agent, or Firm* — Fenwick & West LLP

(57) ABSTRACT

A system and a method are disclosed for providing telephone number sharing services to subscribers over public switched telephone network or data network. The disclosed system maintains a bank of reusable caller identifiers (IDs). The system receives call details of a call from a subscriber of the system. The call details include a caller identifier (ID) preference of the subscriber and a called number corresponding to the called party. The system stores the call details in a database. The system determines whether the call from the subscriber is a first call to the called number. In response to the call being the first call to the called number, the system assigns a call ID from the bank of reusable caller IDs that satisfies the reusable caller ID preference of the subscriber, and connects the call to the called number along with the caller ID.

16 Claims, 7 Drawing Sheets

TELEPHONE NUMBER SHARING CONFIGURATION

CROSS REFERENCE

This application is a continuation of U.S. application Ser. No. 13/633,048, filed Oct. 1, 2012, which is a continuation of U.S. application Ser. No. 13/437,863, filed Apr. 2, 2012, now U.S. Pat. No. 8,306,201, which are incorporated by reference in their entirety.

BACKGROUND

1. Field of Art

The disclosure generally relates to the field of increasing an availability of telephone numbers in public switched telephone network (PSTN) and data network systems.

2. Description of the Related Art

A telephone number or phone number is a digit sequence used to make a call in a PSTN. A phone number in North America, for example, consists of a three-digit area code followed by a seven-digit local number. With the explosive increase in the number of mobile phones and voice over Internet Protocol (VoIP) service providers and subscribers, phone numbers available to users are decreasing, especially in metropolitan areas.

One conventional way to increase a pool of available telephone numbers is through sharing numbers in a multiline telephone system. Multiline telephone systems are used in business environments. Multiline telephone systems use a telephone line associated with a limited set of numbers, e.g., 1 or 2, but provide access from multiple telephones, or "stations", in the system. Business telephone systems configured in this manner are "key systems" and "private branch exchanges."

One problem with conventional sharing systems, such as business telephone systems, is that users of the system are only associated with a local exchange telephone number that is specific to the multiline system. Hence, users themselves do not have the flexibility to be associated with other telephone numbers, for example, telephone numbers outside the local exchange of what is assigned to that telephone line.

Another problem with conventional systems that share numbers is specific users are not assigned specific numbers for purposes of identification from outside of the system. This is particularly challenging for those looking to have caller identification ("caller ID") functionality. Caller ID is a conventional telephone service that displays the caller's number at the telephone or an attached device, so that the called party can easily returns the call. With the caller ID service, the information of the calling number is transmitted from the calling party to the called party over PSTN for a voice call or over data network for a VoIP call. In the conventional caller ID service, the caller has no control over the calling number transferred to the called party over the network.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
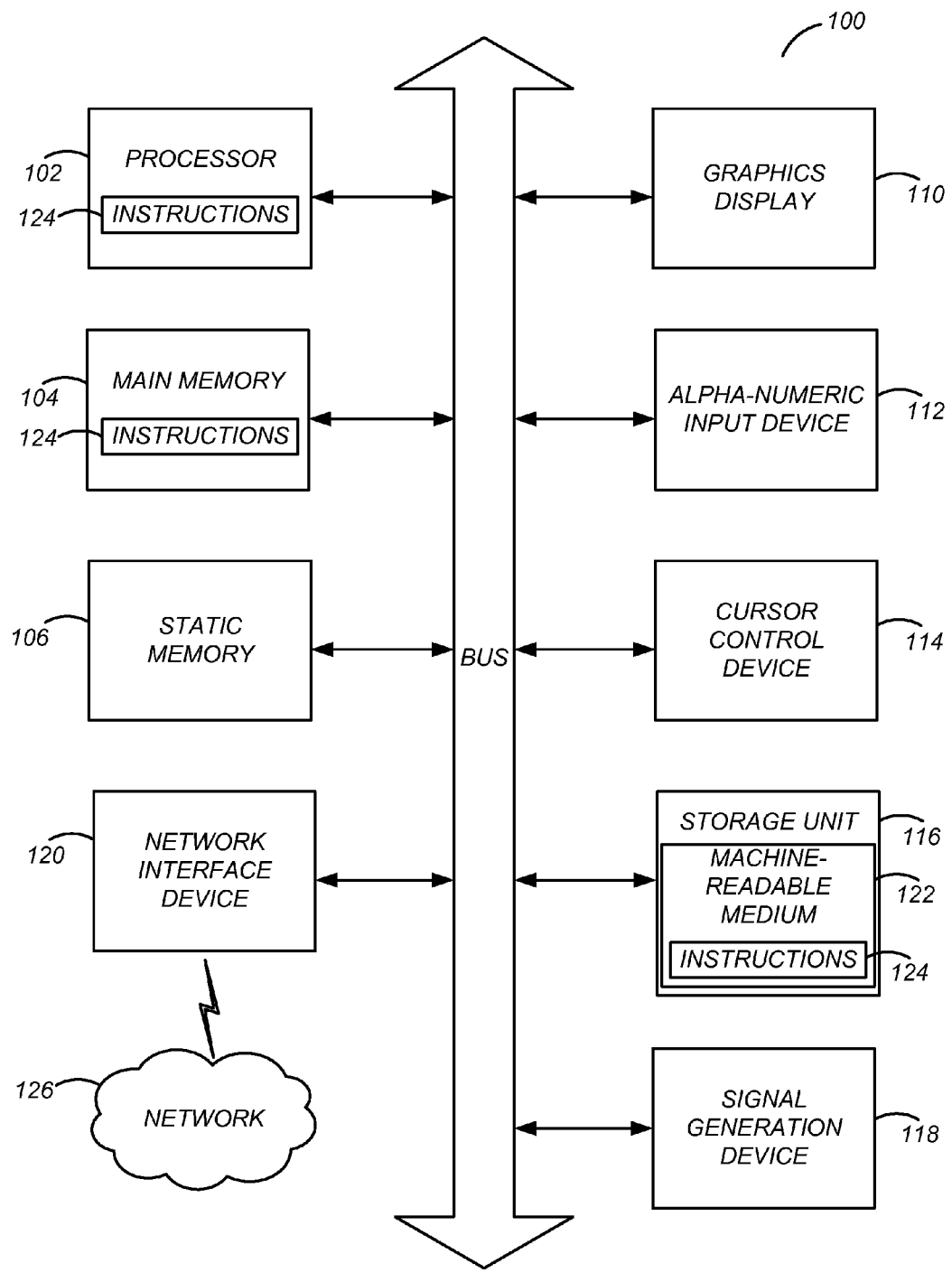
FIG. 1 illustrates one embodiment of components of an example machine able to read instructions from a machine-readable medium and execute them in a processor (or controller) to implement the disclosed telephone interface system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

One embodiment of a disclosed system, method and computer readable storage medium that includes instructions for providing telephone number sharing services to subscribers over a public switched telephone network or data network. The disclosed system provides telephone number sharing services to a number of subscribers. The available phone numbers in a telephone number pool maintained by the system are often limited, and hence, shared among the subscribers. Further, because the probability that all subscribers will have need for a telephone number at the same time is very low, the number of potential subscribers can greatly outnumber the potential pool (or bank) of available telephone numbers.

In addition to expanding the available pool of numbers to service a larger quantum of subscribers, the system described herein can also associate particular numbers from the available pool of telephone numbers to particular subscribers. For example, when making a phone call, a subscriber is assigned a phone number from the pool. The assigned phone number is called a reusable call number. The reusable call number can be an identifier, for example, a caller identification (caller ID), network identification (network ID), or a custom identifier such as a subscriber identification (subscriber ID). By way of example, and for ease of discussion, in embodiments in which the reusable call number is a caller ID, the reusable call numbers shown on a called telephone device, so that the called party can identify the calling party. This type of identification is useful for determining who and/or from where an incoming call is originating and may allow for the called party to conveniently return a call from the calling party if the call cannot be immediately answered. When the called party returns the call, the subscribers can be identified by both the reusable call number and the telephone number of the called party because the reusable call number alone may be associated with more than one subscribers.

Operationally, by way of example, when the system first receives call details for a call from a subscriber (e.g., here the subscriber is a calling party and the call details include the number being called) of the system, the subscriber is identified with the system. The call details stored in a database includes the number called and the subscriber information. In addition, the system determines a call placement preference of the subscriber, including what type of reusable call number to assign for the subscriber. The reusable call number preference of the subscriber can be an identifier, such as a local phone number having an association with a location of a telephone exchange of the subscriber or a local phone number having a telephone exchange proximate to the called party (i.e., a number associated with a phone of a recipient of a call). In one example embodiment, the system determines whether the received call from the subscriber is a first call to the called number. In response to the call being the first call to the called party, the system assigns a reusable call number that satisfies the call placement preference of the subscriber. The system stores the assigned reusable call number with the call details in the database. Hence the call details include the number called, reusable call number and the subscriber information. On the other hand, in response to the call not being the first call to the called party, the system retrieves a reusable call number assigned to the subscriber from previous calls to the called number, and forwards the call to the called number with the retrieved reusable call number. The reusable call number assigned to the subscriber may include a local number to the subscriber, a local number to the called number, a toll-free number, a premium-rate number, and any acceptable random number. The system also stores the reusable call number assigned to the subscriber for the call to the called number. Once the reusable call number is assigned, the call is forwarded to the called number with the reusable call number, which can be treated as a caller ID in one embodiment and provided for display as a caller ID by a device of the call recipient.

The configuration described herein also can work for a call received by the subscriber of the system. For example, when the system receives a call from a calling number to a reusable call number previously assigned to a subscriber, the system does a database look up to determine whether the number of the calling party, the reusable call number and/or the subscriber information can be identified. In response to a successful identification, the system forwards the call to a phone number of the subscriber. Thus, in a successful operation, the calling number would be a previous called number by the subscriber and the reusable call number would be identified with the subscriber so that the call goes directly to the subscriber. While in response to an unsuccessful identification of the subscriber, the system notifies the calling party that the reusable call number is not active and terminates the call. Accordingly, in the scenario of a subscriber receiving a call from outside the system, the system is able to use a limited pool of telephone numbers to serve a larger number of subscribers and still direct calls from outside the system to the subscriber.

Computing Machine Architecture

Turning now to greater details of the introduced configurations, reference is first made to FIG. (FIG. 1. FIG. 1 is a block diagram illustrating components of an example machine able to read instructions from a machine-readable medium and execute them in a processor (or controller) to implement the disclosed telephone interface system. Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software or program code) embodying any one or more of the methodologies or functions described herein. The instructions 124 may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Telephone Interface System

Figure 2:
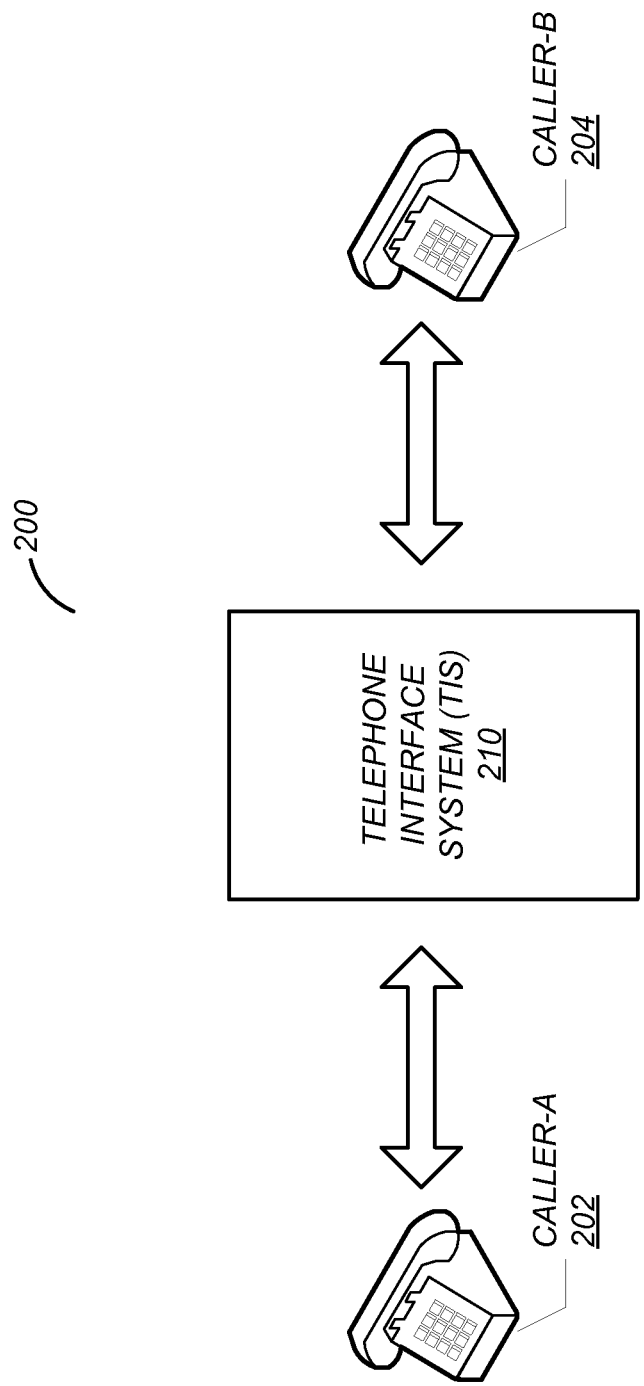
FIG. 2 illustrates a high-level block diagram of an example communications system for providing telephone number sharing services.

Turning next to FIG. 2, it illustrates a high-level block diagram of an example communications system 200 for providing telephone number sharing services. The system 200 comprises a telephone interface system (TIS) 210 through which a caller-A 202 and a caller-B 204 communicate. Both caller-A 202 and caller-B 204 connect to the TIS 210 through communication networks (not shown) that transmits voice or data between the caller-A 202 and the caller-B 204. The communication networks include public switched telephone network (PSTN), wireless network, mobile network and/or a data network (e.g., the Internet).

The callers 202 and 204 in one embodiment communicate using electronic devices that can place (or make) and/or receive phone calls through the system 200. The electronic devices have connectively with one or more of the communication networks and can include wired telephone sets, mobile phones, personal digital assistants (PDAs), smartphones, tablets, netbooks, laptops, or desktop computers. It is noted that although only two callers caller-A 202 and caller-B 204 are illustrated in FIG. 2, the system 200 may include hundreds or thousands of such callers that can communicatively interact with the TIS 210.

In one embodiment, callers place telephone calls, e.g., landline or cellular calls, over PSTN. In this case, the callers may need to dial an access number to connect to the TIS 210 before making the call to the intended party. Alternatively, electronic devices include functionality for communicating over a data network. For example, a smartphone can exchange Internet Protocol (IP)-based data over WiFi, 3G, or LTE connections. A traditional telephone set may also make voice-over IP (VoIP) calls when hooked up to a VoIP dongle, such as a magicJack®, that plugs into a computer or a networking device with Internet connections. To support these functionalities, callers may be identified by multiple identifiers. For example, the caller-A 202 may have a telephone number that serves as its identifier for the PSTN and/or a network address, e.g., IP address, which serves as its identifier on the data network, as well as other identifiers.

Additionally, calling devices may execute one or more program modules to provide calling functionality. The program modules may include modules integrated into the devices, e.g., integrated into the dialing function of the devices' firmware or operating system. Alternatively, the program modules may be distinct from the devices, such as third-party calling applications that are downloaded to the devices at the directions of the users.

The TIS 210 is typically formed of one or more computers, such as the computer system 100 shown in FIG. 1. The telephone number sharing services provided by the TIS 210 can be implemented on a private branch exchange (PBX) platform, a soft switch system, or any other devices used to route telephone calls. Thus the TIS 210 can communicate with the caller-A 202 and caller-B 204 over PSTN and/or data network. While only one TIS 210 is shown in the system 200 of FIG. 2, different embodiments may include multiple TIS systems operated by a single entity or multiple entities.

As mentioned above, in order for a caller to place a phone call and receive a call through the TIS 210, the caller needs to subscribe to the telephone number sharing services provided by the TIS 210. By way of example in this disclosure, it is assumed for the ease of discussion that caller-A 202 is a subscriber of the telephone number sharing service, while caller-B 204 may or may not be a subscriber.

Figure 3:
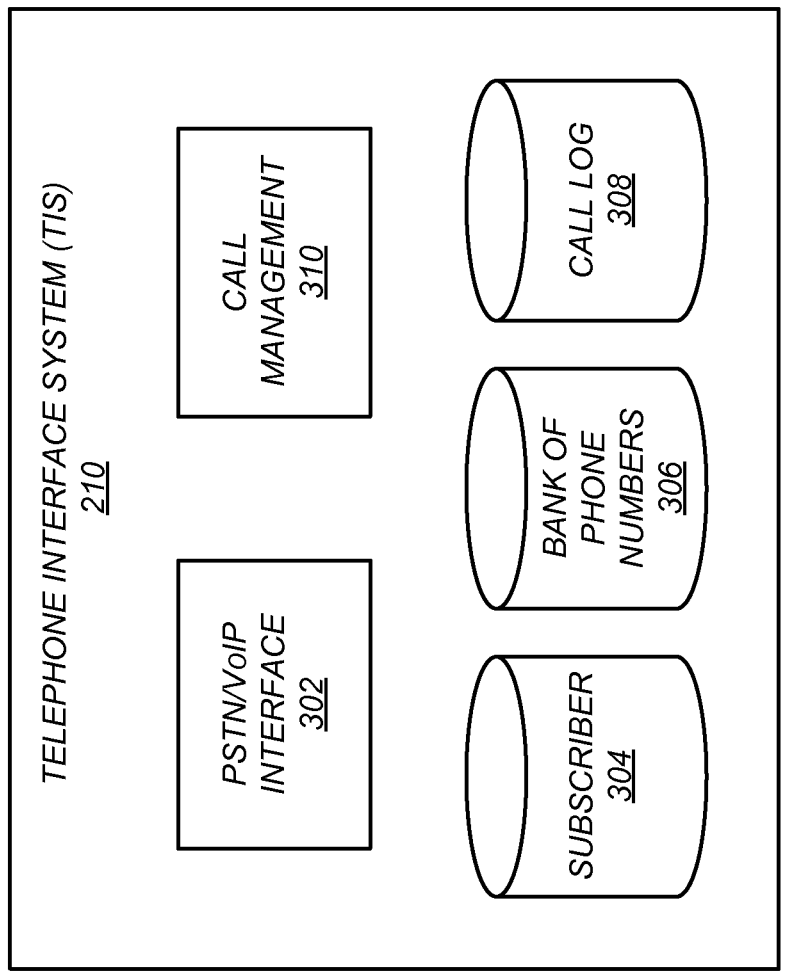
FIG. 3 illustrates an example of the architecture of the telephone interface system for providing telephone number sharing services.

Referring now to FIG. 3, it is a block diagram illustrating an exemplary architecture of the telephone interface system 210 in one embodiment. The TIS 210 includes a PSTN/VoIP interface 302, a subscriber database 304, a bank of phone numbers 306, a call log database 308, and a call management module 310. The bank of phone numbers 306 can include tens, hundreds, thousands or multiple thousands of telephone numbers. In some embodiments, the number of telephone numbers within the bank can be significantly lower (e.g., a magnitude of 10, 100 or more) than the number of subscribers. The numbers within the bank of phone numbers can correspond to telephone number formats from around the world, including appropriate country codes. In general, the call management module 310 manages the telephone number sharing services and interacts with the PSTN/VoIP interface 302. The call management module 310 also interacts with various databases, such as the subscriber database 304, the bank of phone numbers 306, and the call log database 308, which store data structures corresponding to their respective data objects maintained at the TIS 210. Depending upon the embodiment, the databases 304, 306 and 308 may be relational, flat, and/or other type of database. The databases 304, 306, 308 may be local to or remote from the TIS 210. In alternative configurations of the telephone interface system, different or additional modules may be included in the TIS 210.

The PSTN/VoIP interface 302 interfaces with the calling parties, such as caller-A 202 and caller-B 204. By way of example, an incoming phone call arriving at the TIS 210 may come from a subscriber of the TIS service, e.g., caller-A 202 to a called party, e.g., caller-B 204, or a returning call, e.g., from caller-B 204, to a reusable call number previously assigned by the TIS 210 to one of the subscribers, e.g., caller-A 202. At the direction of the call management module 310, the PSTN/VoIP interface 302 forwards the incoming call either to the called party, or a phone number registered to the subscriber associated with the assigned reusable call number. As mentioned previously, the TIS 210 can communicate with the callers over PSTN and/or data network, the PSTN/VoIP interface 302 thus supports both Signaling System No. 7 (SS7) to setup and tear down telephone calls on PSTN, and Session Initiation Protocol (SIP) signaling for controlling VoIP sessions. In addition, the PSTN/VoIP interface 302 may also function as a SS7-SIP gateway that intercepts, converts, and interconnects calls between PSTN and data network.

The subscriber database 304 stores information about subscribers and their service plans and preferences. A subscriber can register with the system, which, in turn, creates a profile for the subscriber within the system. The profile may include a subscriber ID that uniquely identifies the subscriber, a username and password to login to the system, phone numbers associated with the subscriber, and billing information, such as credit card number and billing address.

In one example embodiment, the subscriber may be prompted to choose a service plan when registering with the system. For example, the subscriber can select a static reusable call number associated with his or her telephone number. Alternatively, the reusable call number may be dynamically assigned based on the called party when the subscriber makes a call. In addition, the subscriber may also configure his or her preference in choosing the reusable call number. For example, the subscriber may elect preference for a local number with the same area code of the phone numbers associated with the subscriber, or a local number similar to the called party (e.g., same area code or local exchange number). In other embodiments, the subscriber's preference can be stored or updated when the subscriber places a first (e.g., initial) call.

The bank of phone numbers 306 is a database storing phone numbers within the system 200, e.g., within the TIS 210. Phone numbers available at the bank of phone numbers 306 include local numbers (e.g., phone numbers with the same country code and/or area code of the phone numbers associated with the subscribers or called parties), toll-free numbers (e.g., 800, 866, or 888 numbers), information numbers (e.g., 555), premium-rate numbers (e.g., 900 numbers), and/or any other acceptable random numbers (e.g., 111-111-1111). The toll-free numbers and the premium-rate numbers may be ideal for businesses to provide customer services or to facilitate temporary solutions. For example, a media network plans to conduct a telephone survey (e.g., poll on election) or a phone voting for a reality show (e.g., American Idol®) with a pool of telephone sets. The TIS 210 can assign a single number, e.g., an 800 or 900 number, to all the calls made from this pool of telephones each has a different number. All the incoming calls to the assigned number, e.g., the 800 or 900 numbers, can be routed to and distributed among the telephones in the pool by the TIS 210.

As mentioned previously, phone calls placed by the subscribers to called parties are assigned various types of reusable call numbers by the TIS 210. In one embodiment, the assigned reusable call numbers can be used for display within caller ID enabled systems. For example, an electronic device (e.g., mobile phone or wired telephone set) enabled with caller ID services can receive a reusable call number from the TIS 210. The reusable call number can be displayed on a screen of the electronic device. The recipient (e.g., caller-B 204) of the subscriber's call (e.g., a call by caller-A 201) can use the electronic device to return the call directly to the subscriber using the reusable call number. Returning phone calls via the reusable call numbers are received by the TIS 210 and then dispatching to the appropriate corresponding subscriber.

The bank of phone numbers 306 and/or associated database also stores status information corresponding to the assignment status of each available number. The assignment status indicates whether a number in the bank is available to be assigned or has been assigned, and possibly unavailable to further assignment. In one embodiment, the status information also includes the subscriber and called number assigned with the reusable call number, date and/or time of the assignment, date and/or time since last call, number of calls from and to the reusable call number.

The call log database 308 stores detailed information on all the incoming and outgoing phone calls, which can be queried by the call management module 310. In one embodiment, a detailed call log entry includes information on the subscriber ID who initiates the call, a contact number associated with a party-A (From #), e.g., caller-A 202 (when calling caller-B 204), such as a phone number or an email address, the phone numbers of party-B (To#), e.g., caller-B 204 (when receiving a call from caller-A 202), a reusable call number assigned for the call, date/time of the call, and optionally call duration. For example, a call entry may look like the following:

Subscriber ID: (From #, To #, Assigned reusable call number, Date/Time).

The call management module 310 manages phone calls to and from subscribers. When receiving a call setup request from a subscriber at the PSTN/VoIP interface 302, the call management module 310 first validates the subscriber's ID to ensure that the incoming call is authenticated, e.g., from a legitimate subscriber. The call management module 310 may also verifies the billing information for the subscriber's service plan, for example, to verify that the account balance of the subscriber is sufficient or the subscription fee is not overdue. Next, the call management module 310 determines whether a new reusable call number needs to be assigned for the call by query the bank of phone numbers 306 or the call log database 308. For example, an active reusable call number may have been associated with the subscriber in a static configuration saved in the subscriber's profile, or have been assigned for previously calls to the called party detailed in the call log database 308. Otherwise a new reusable call number is required if it is a first time call made by the subscriber to the called party, or the previously assigned called ID is expired or no longer available.

In cases that require assignment of a new reusable call number, the call management module 310 checks the subscriber's preference for the reusable call number (e.g., the type of the reusable call number being a local number, a toll-free number, or a random number), and accordingly requests a reusable call number from the bank of phone numbers 306. Otherwise, the call management module 310 retrieves the reusable call number previously assigned for the call to the phone number of the called party. Once a reusable call number is determined, the call management module 310 instructs the PSTN/VoIP interface 302 to route the call to the called party with the call ID. The reusable call number assigned or retrieved by the call management module 310 can be appended as a caller ID, for example, in an SS7 Initial Address Message (IAM) or the "From" field in a SIP message header, and propagated to the called party. After the call is done, the call management module 310 may optionally notify the call log database 306 to update the corresponding call log entry.

When receiving a returning call to a reusable call number at the PSTN/VoIP interface 302, the call management module 310 queries the call log database 308 to identify the subscriber associated with the reusable call number. If the reusable call number is active and a subscriber is successfully identified, the call management module 310 routes the call to the telephone number of the identified subscriber. When the reusable call number has expired or is no longer active, the call management module 310 can terminate the call or playback an auto response to the calling party before terminating the call.

Call Handling at Telephone Interface System (TIS)

Figure 4:
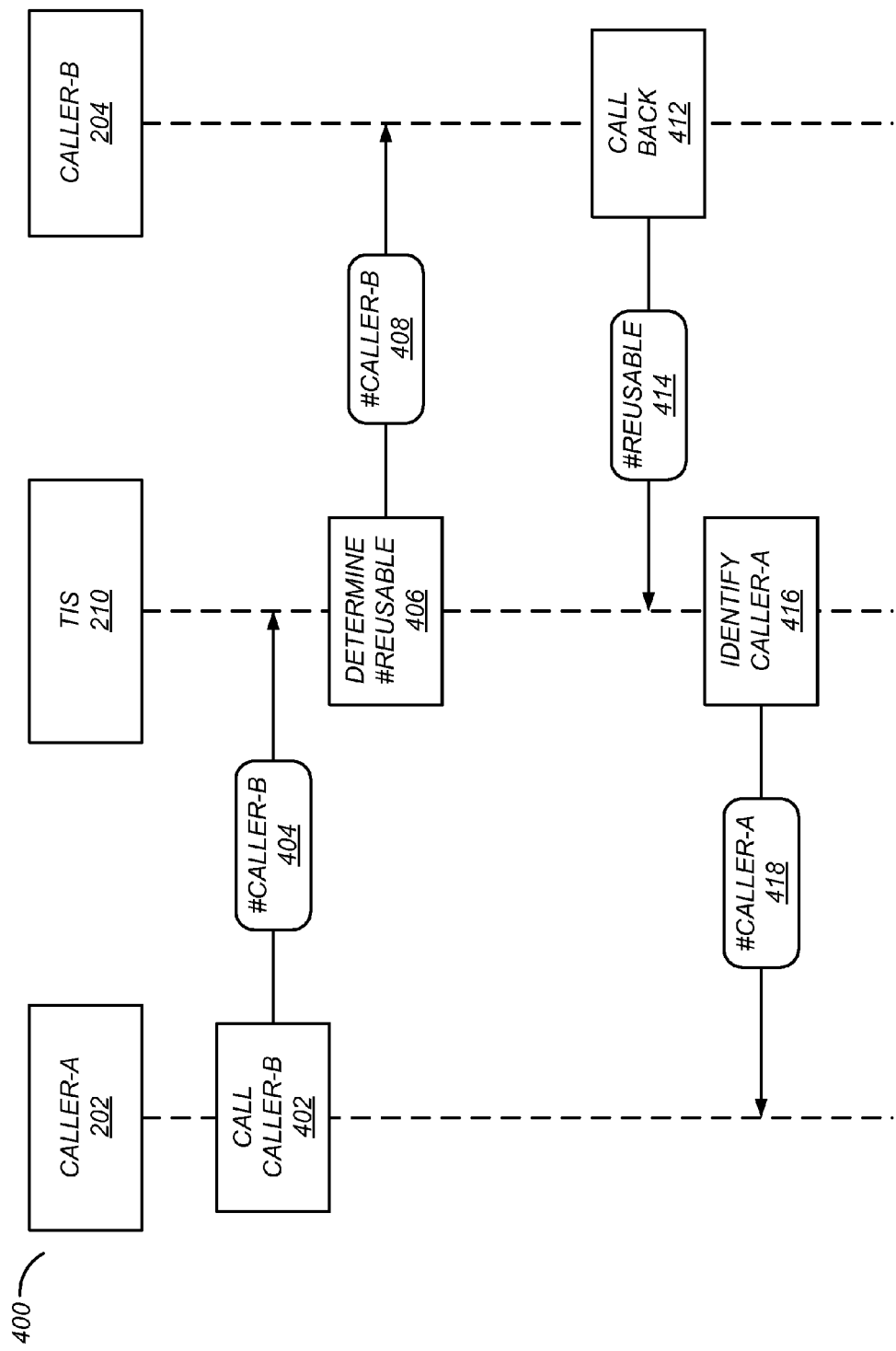
FIG. 4 illustrates one embodiment of an event trace corresponding to an example operation of the communications system for providing telephone number sharing services.

Referring now to FIG. 4, there is shown an event trace corresponding to an example operation of the communications system 200. The steps shown are intentionally high level and represent inputs, behaviors, and output of the system elements described herein, as well as high level inter-process or inter-module communication. Those of skill in the art will appreciate the steps shown can be implemented in practice as multiple individual operations. Further, the communication system 200 operates at least in part asynchronously in an event driven manner, and thus the steps shown in FIG. 4 are to be understood as occurring in most cases in response to received signals or events, as will be clear from the context of the description.

In FIG. 4, the communications system 200 that provides telephone number sharing services comprises the TIS 210, the caller-A 202 that is a subscriber of the telephone number sharing services at TIS 210, and the caller-B 204, which may or may not be a subscriber. Initially in this example, caller-A 202 will be the calling party (party placing the call) and caller-B 204 will be the called party (party receiving the call). The operation starts when caller-A 202 places 402 a call to caller-B 204. A call setup message, such as the SS7 IAM, carrying the telephone number 404 of caller-B 204 (the called party number at this point in the example) is sent to the TIS 210. Upon receiving the call setup message, the TIS 210 determines 406 a reusable call number that satisfies the reusable call number preference of caller-A 202 for the call to caller-B 204. Based on this determination, a reusable call number is assigned for the call. This reusable call number is stored in a call log (e.g., the call log database 308) along with the subscriber ID, the telephone number of the called party, and date/time for the call. The TIS 210 routes the call to the phone number 408 of caller-B 204 which shows the reusable call number assigned to the call by the TIS 210.

Continuing with FIG. 4, the system also provide for calls back from caller-B 204 (now the calling party at this point in this example) to caller-A 202 (now the called party at this point in this example). When caller-B 204 calls 412 caller-A 202 back, caller-B 204 dials the reusable call number 414 previously assigned to caller-A 202. The TIS 210 receives the call dialed from caller-B 204. The TIS 210 does a lookup in the call log for the phone number of caller-B 204 and for the reusable call number dialed by caller-B 204. If a match is found in the call log (e.g., in the call log database 308), the call log also identifies 416 the subscriber (caller-A 202). The TIS 210 forwards 418 the call to the number of caller-A 202. If no match is found in the call log, the TIS 210 returns a message to caller-B 204 indicating that the call cannot be completed and the call is disconnected.

Figure 5:
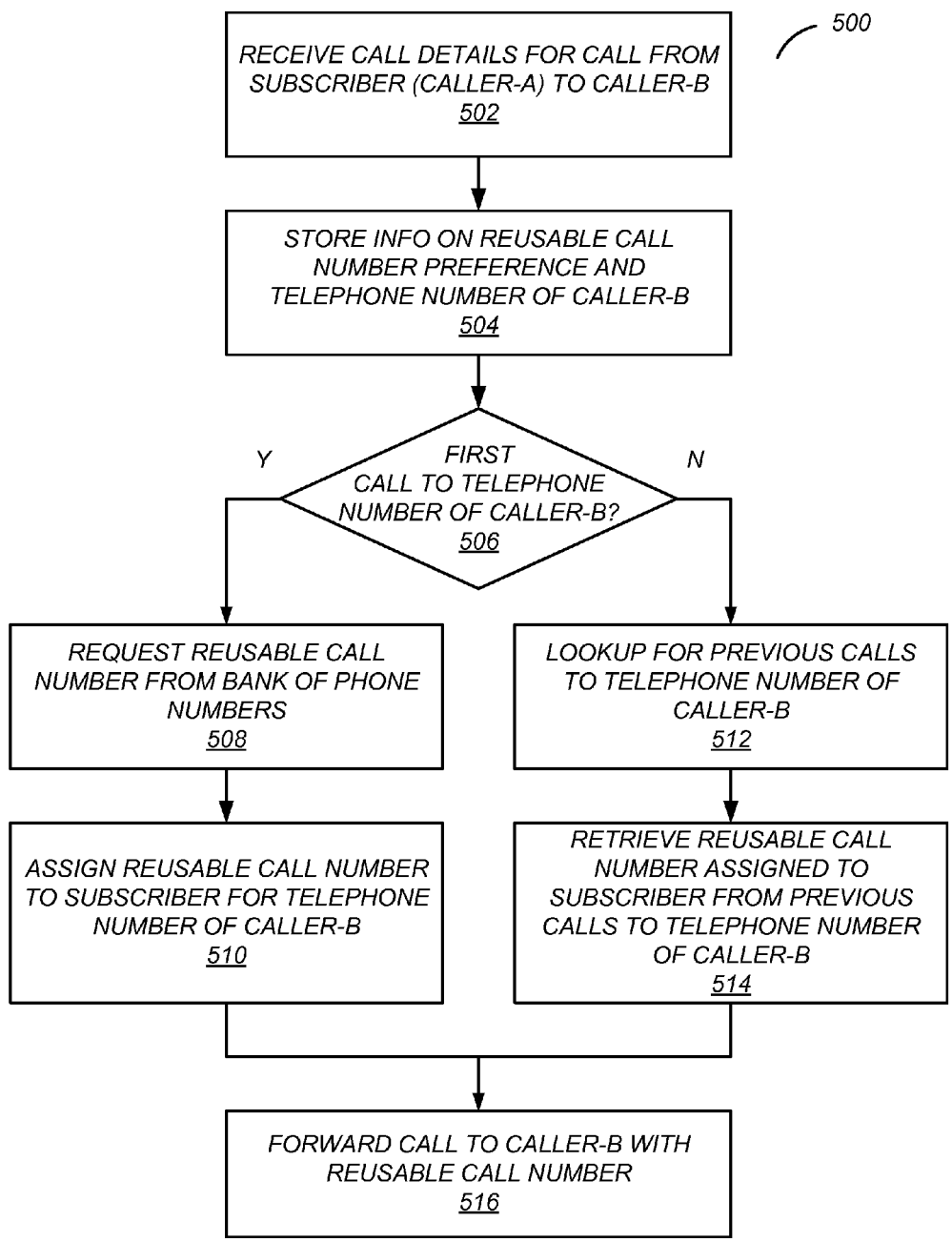
FIG. 5 illustrates one embodiment of an example method for handling calls from a subscriber of the telephone number sharing services at the telephone interface system.

FIG. 5 illustrates one embodiment of an example method 500 for handling calls from a subscriber of the telephone number sharing services at the telephone interface system. In this process, caller-A 202 (calling party at this point in this example, and a subscriber) is placing call to caller-B 204 (called party at this point in this example). The TIS 210 receives the call details for the call from the subscriber, caller-A 202, to the called party caller-B 204. The call details include the subscriber user credentials, i.e., caller-A 202, (e.g., username, password and billing information), reusable call number preference (e.g., type of the reusable call number), and telephone number of the caller-B 204. The TIS stores 504 the detailed call information, such as the reusable call number preference and phone number of caller-B 204, in a call log in the database (e.g., subscriber database 304 and call log database 308).

In one embodiment, the TIS 210 determines 506 whether this call is a first call to the telephone number of caller-B 204. If so, the TIS 210 requests 508 a reusable call number that satisfies the reusable call number preference of caller-A 202 (e.g., a local exchange telephone number corresponding to local exchanges of caller-A's physical location) from a bank of phone numbers (e.g. bank of phone numbers 306), and assigns 510 the reusable call number returned from the bank of phone numbers to the subscriber for the telephone number of caller-B.

Figure 6:
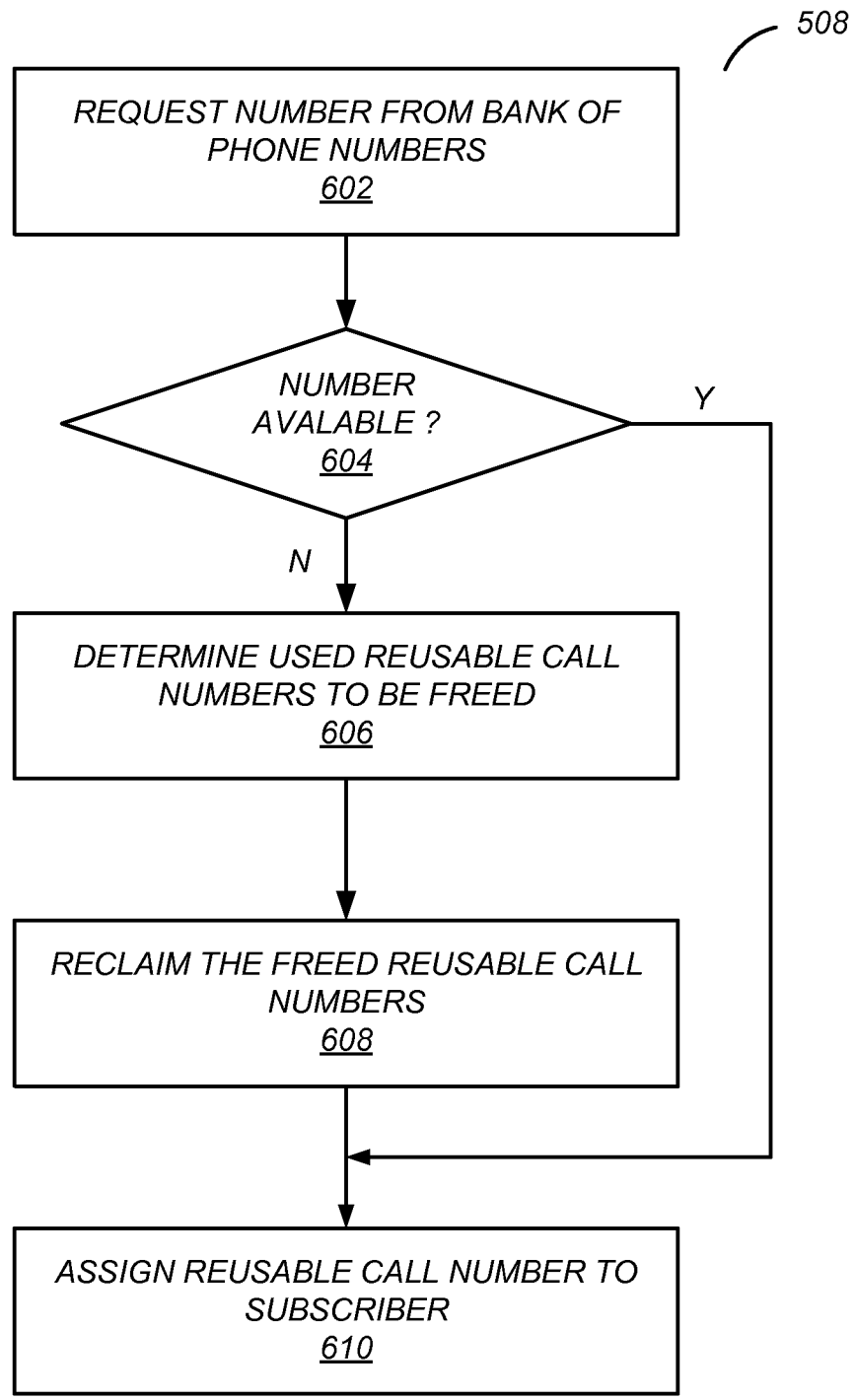
FIG. 6 illustrates one embodiment of an example method for requesting a reusable call number from the bank of phone numbers.

Turning briefly to FIG. 6, it illustrates an example embodiment of method 508 of requesting 602 a reusable call number from the bank of phone numbers. As noted previously, bank of phone numbers may include tens, hundreds, thousands or multiples thereof of potentially available reusable call numbers. For example, after determining that a new reusable call number is needed, the call management module 310 requests a reusable call number from the bank of phone numbers 306 as described above in reference to FIG. 3. The bank of phone numbers then determines 644 whether there is a number available for the request. If there is a number available that meets the subscriber's requirement for the reusable call number, the bank of phone numbers assigns 610 the reusable call number to the subscriber and updates the assignment status of the reusable call number.

On the other hand, if all the reusable call numbers have been put in use, e.g., due to the number of available phone numbers being less than the number of subscribers, TIS 210 database system managing the bank of phone numbers determines 606 which used reusable call numbers can be freed. To determine the reusable call number to be freed, the bank of phone numbers ranks the reusable call numbers based on a variety of parameters, for example, service plans associated with the reusable call numbers, the number and frequency of usages, lifetime since the first assignment, time since the last use, or any combination of these parameters. For example, the bank of phone numbers can rank the used reusable call numbers based on usage, (e.g., the number of calls placed with and returned to a reusable call number) and frees the least used predetermined set of numbers, e.g., 10 numbers. The bank of phone numbers next reclaims 608 the freed reusable call numbers before assigning 610 one of the freed reusable call number to the subscriber.

Referring back to FIG. 5, in case when the subscriber caller-A 202 has made calls to the telephone number of caller-B 204 before, there has been a reusable call number assigned to caller-A 202 for calls to caller-B 204. The TIS 210 looks up 512 call history (e.g., from call log database 308) for previous call entries placed by caller-A 202 to caller-B 204, and retrieves 514 the reusable call number assigned to the subscriber caller-A 202 from previous calls to the telephone number of caller-B 204. Once a reusable call number is determined, the TIS 210 forwards 516 the call to caller-B 204. It is noted that the system 200 can be configured so that the reusable call number is not made available for caller ID type configurations of the electronic device used by caller-B 204, although alternately it may be included for use in display with the caller ID system.

Figure 7:
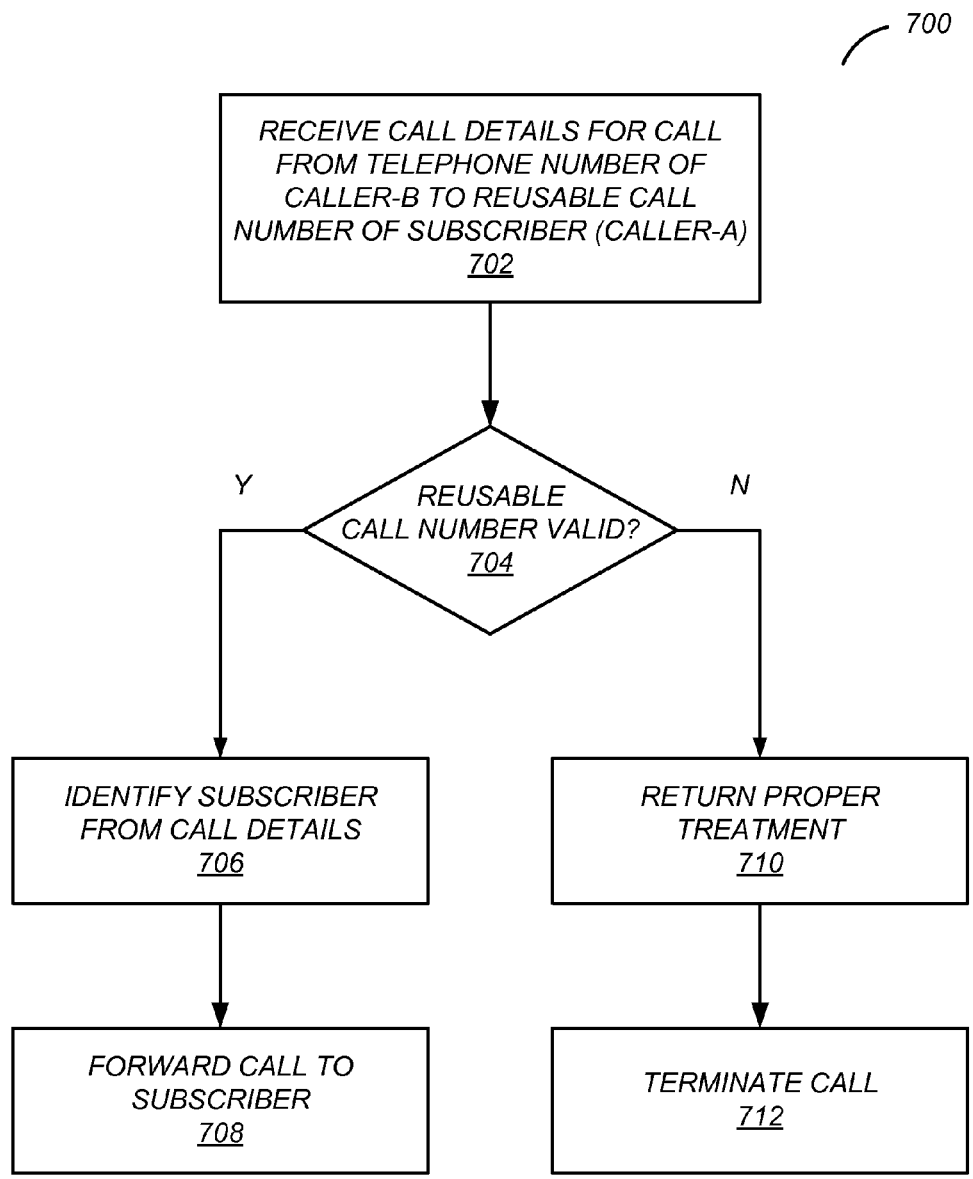
FIG. 7 illustrates one embodiment of an example method for handling returning calls to a subscriber of the telephone number sharing services at the telephone interface system.

Turning now to FIG. 7, it illustrates one embodiment of an example method 700 for handling returning calls to a subscriber of the telephone number sharing services at the telephone interface system. In this example, the process starts when the TIS receives 702 call details for a call from the telephone number of caller-B 204 to the reusable call number of a subscriber (e.g., caller-A 202). The call details include the reusable call number and telephone number of the caller-B 204. The TIS 210 determines 704 whether the reusable call number is a valid number by querying databases storing information on reusable call number assignments (e.g., subscriber database 304, bank of phone numbers 306, and call log database 308). The reusable call number is valid, for example, if it has been assigned to a subscriber for previous calls to caller-B. On the other hand, the reusable call number may be invalid if the number is a random number because the subscriber chooses not to take any returning calls, or the reusable call number assignment has been expired.

In one embodiment, the TIS 210 determines that the reusable call number is valid and identifies 706 the subscriber to whom the reusable call number has been assigned from the call details. The TIS 210 forwards 708 the call to the subscriber (e.g., caller-A). In case that the reusable call number is invalid, the TIS 210 returns 710 a proper treatment, such as an interactive voice response (IVR) informing caller-B that the reusable call number is no longer active. The TIS 210 terminates 712 the call afterwards.

The disclosed system provides telephone number sharing services to subscribers. Consider a first example: a guest checks in to a room at a hotel, which has the telephone number sharing services deployed in its private branch exchange (PBX) system. The guest can request a reusable call number for the telephone in the room with the same area code as his or her home town. When the guest calls family or friends at home, a local caller ID shows up. The called party can easily return the call to the reusable call number without knowing the telephone number of the hotel and the guest's room number. The reusable call number can be disabled when the guest checks out. In addition, guests at different rooms can share the same reusable call number as long as their preferences allow and their called parties differ from each other.

Now consider a second example: if the guest is a frequent traveling professional who checks in at the hotels of a hotel chain around the country or all round the world. The telephone number sharing services bring even greater convenience to the guest given that a fixed reusable call number is assigned to his or her account at the hotel chain. In this example, multiple TIS systems need to be deployed at different locations of the hotel chain interconnected with each other over PSTN or the Internet with synchronized databases for bank of phone numbers and call history logs. In alternative configurations, a central database can be set up for the multiple TIS systems instead.

The telephone number sharing services provided by the disclosed system provide a number of benefits to the subscribers. For example, telephone numbers available to subscribers can be greatly expanded. Depending upon a subscriber's preference, telephone numbers of various types (e.g., a local number for the called party, toll-free number, or other acceptable random numbers) can be shared by multiple subscribers, possibly at reduced cost for a specific period of time. In addition, subscribers can control whether to take returning calls and from whom. For instance, a subscriber is expected to receive only returned calls from those the subscriber has called. If the subscriber decides not to take calls in response, he or she can release the assigned reusable call number by setting an expiration date/time, or just specify a random number for the reusable call number before making any calls. Further, the disclosed system provides a true portability of local numbers because it not only allows the subscribers to place calls to called parties, but also to receive returning calls from the called parties using the same reusable call number.
Additional Configuration Considerations Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software or program code) may be driven by cost and time considerations.

The various operations of example methods described herein may be performed, at least partially, by one or more processors, e.g., processor 102, that are temporarily configured (e.g., by software or program code) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing the telephone number sharing services through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing communication number sharing services, the method comprising:
    maintaining, in a computing system, a bank of reusable caller identifiers (IDs), the bank of reusable caller IDs ordered based on usage and including one or more previously assigned caller IDs;
    receiving, by the computing system, communication details for a communication from a subscriber of the computing system to a contacted number belonging to a contacted party, the communication details including caller identifier (ID) information associated with the subscriber;
    determining, by the computing system, whether the communication from the subscriber is a first communication to the contacted number;
    responsive to the communication being the first communication to the contacted number,
        assigning, by the computing system, a caller ID from the bank of reusable caller IDs by reclaiming a previously assigned caller ID that satisfies the caller ID information associated with the subscriber;
        storing, in the computing system, the assigned caller ID as a caller ID assigned to communications between the subscriber and the contacted number;
    responsive to the communication not being the first communication to the contacted number,
        retrieving, by the computing system, the caller ID previously assigned to communications between the subscriber and the contacted number; and
    connecting, by the computing system, the communication between the contacted number and the caller ID assigned to the subscriber.

2. The method of claim 1, wherein each caller ID is one of a phone number and a pre-assigned subscriber identification number.

3. The method of claim 1, further comprising:
    receiving the communication from a contacting number to the caller ID at the computing system;
    determining whether the caller ID is assigned to communications between the subscriber and the contacting number;
    responsive to a determining the caller ID is assigned to communications between the subscriber and the contacting number, connecting the received communication to a subscriber number associated with the subscriber; and
    responsive to a unsuccessful identification of the subscriber, notifying the contacting number that the caller ID is not valid and terminating a returning communication.

4. The method of claim 3, wherein the subscriber number associated with the subscriber is one of a phone number and a pre-assigned subscriber identification number.

5. The method of claim 1, wherein the caller ID information associated with the subscriber includes using a telephone number as the caller ID, wherein the telephone number is at least one of:
    a local exchange number to the subscriber;
    a local exchange number to the contacted number;
    a toll-free number; and
    a premium-rate number.

6. The method of claim 1, wherein the communication comprises voice data.

7. The method of claim 1, wherein the communication comprises non-voice data.

8. The method of claim 1, further comprising:
    reclaiming the assigned caller ID after a predetermined period of time.

9. A non-transitory computer-readable storage medium storing computer executable computer program instructions for providing telephone number sharing services, the computer program instructions comprising instructions that when executed by a processor of a computing system perform the steps of:
    maintaining, in a computing system, a bank of reusable caller identifiers (IDs), the bank of reusable caller IDs ordered based on usage and including one or more previously assigned caller IDs;
    receiving, by the computing system, communication details for a communication from a subscriber of the computing system to a contacted number belonging to a contacted party, the communication details including caller identifier (ID) information associated with the subscriber;

determining, by the computing system, whether the communication from the subscriber is a first communication to the contacted number;

responsive to the communication being the first communication to the contacted number, assigning, by the computing system, a caller ID from the bank of reusable caller IDs by reclaiming a previously assigned caller ID that satisfies the caller ID information associated with the subscriber;

storing, in the computing system, the assigned caller ID as a caller ID assigned to communications between the subscriber and the contacted number;

responsive to the communication not being the first communication to the contacted number, retrieving, by the computing system, the caller ID previously assigned to communications between the subscriber and the contacted number; and connecting, by the computing system, the communication between the contacted number and the caller ID assigned to the subscriber.

10. The storage medium of claim 9, wherein each caller ID is one of a phone number and a pre-assigned subscriber identification number.

11. The storage medium of claim 9, wherein:

receiving the communication from a contacting number to the caller ID at the computing system;

determining whether the caller ID is assigned to communications between the subscriber and the contacting number;

responsive to a determining the caller ID is assigned to communications between the subscriber and the contacting number, connecting the received communication to a subscriber number associated with the subscriber; and responsive to a unsuccessful identification of the subscriber, notifying the contacting number that the caller ID is not valid and terminating a returning communication.

12. The storage medium of claim 11, wherein the subscriber number associated with the subscriber is one of a phone number and a pre-assigned subscriber identification number.

13. The storage medium of claim 9, wherein the caller ID information associated with the subscriber includes using a telephone number as the caller ID, wherein the telephone number is at least one of:

a local exchange number to the subscriber;

a local exchange number to the contacted number;

a toll-free number; and a premium-rate number.

14. The method of claim 9, wherein the communication comprises voice data.

15. The method of claim 9, wherein the communication comprises non-voice data.

16. The storage medium of claim 9, further comprising:

reclaiming the assigned caller ID after a predetermined period of time.

* * * * *